US006725823B2

(12) United States Patent
Hori et al.

(10) Patent No.: US 6,725,823 B2

(45) Date of Patent: Apr. 27, 2004

(54) LUBRICATING OIL SUPPLY STRUCTURE FOR INTERNAL COMBUSTION ENGINE

(75) Inventors: Yoshiaki Hori, Saitama (JP); Tohru Nishi, Saitama (JP); Hideyuki Tawara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/283,256

(22) Filed: Oct. 30, 2002

(65) Prior Publication Data

US 2003/0121490 A1 Jul. 3, 2003

(30) Foreign Application Priority Data

Nov. 1, 2001 (JP) ....................................... 2001-336712

(51) Int. Cl.[7] ............................. F01M 1/08; H02K 9/19

(52) U.S. Cl. .................................................... 123/196 R

(58) Field of Search ......................... 123/196 R, 196 W, 123/198 R; 184/5, 6.3

(56) References Cited

U.S. PATENT DOCUMENTS

| | | | | | |
|---|---|---|---|---|---|
| 5,495,833 | A | * | 3/1996 | Ishizaka et al. | 123/196 R |
| 5,509,381 | A | * | 4/1996 | Fisher | 123/196 R |
| 6,202,621 | B1 | * | 3/2001 | Inumaru et al. | 123/196 R |
| 6,205,971 | B1 | * | 3/2001 | Inumaru et al. | 123/196 R |
| 6,257,192 | B1 | * | 7/2001 | Yamaura et al. | 123/196 R |
| 6,497,211 | B2 | * | 12/2002 | Nomura et al. | 123/196 R |
| 6,554,104 | B2 | * | 4/2003 | Ohyama et al. | 123/196 R |

FOREIGN PATENT DOCUMENTS

| | | |
|---|---|---|
| JP | 2686595 B2 | 11/1995 |

* cited by examiner

*Primary Examiner*—Henry C. Yuen
*Assistant Examiner*—Jason Benton
(74) *Attorney, Agent, or Firm*—Birch, Stewart, Kolasch & Birch, LLP

(57) ABSTRACT

To provide a lubricating oil supply structure for an internal combustion engine, which requires no lubricating oil passage to be defined in a crankshaft, is capable of ejecting lubricating oil to a lubrication object, is free of limitations on the layout of the generator and peripheral devices, is capable of cooling generating coils of the generator, and allows the area of the lubrication object to which the lubricating oil is applied to be set with large freedom. A lubricating oil supply structure for an internal combustion engine has a generator having a stator with generating coils and a rotor. A one-way clutch is disposed opposite to the stator across the rotor. The lubricating oil supply structure includes a first nozzle disposed on a stator support of a generator cover for continuously ejecting lubricating oil. The lubricating oil is ejected from the first nozzle to the one-way clutch through holes which are disposed in a position confronting the one-way clutch in an ejected direction. The lubricating oil supply structure also has a second nozzle for continuously ejecting the lubricating oil to a side of the generating coil.

18 Claims, 3 Drawing Sheets

LUBRICATING OIL SUPPLY STRUCTURE FOR INTERNAL COMBUSTION ENGINE

CROSS-REFERENCE TO RELATED APPLICATIONS

This nonprovisional application claims priority under 35 U.S.C. §119(a) on Patent Application No. 2001-336712 filed in Japan on Nov. 1, 2001, the entirety of which is hereby incorporated by reference.

BACKGROUND OF THE INVENTION

1. Field of the Invention

The present invention relates to a structure for supplying lubricating oil to a lubrication object in an internal combustion engine. The engine includes a generator having a stator with a generating coil and a rotor coupled to a crankshaft. The lubrication object is mounted on the crankshaft and is disposed opposite to the stator across the rotor in an axial direction. The lubrication object may, for example, be a one-way clutch for connecting a starter driven gear rotatably mounted on the crankshaft and the rotor of the generator which is coupled to the crankshaft.

2. Description of Related Art

One conventional lubricating oil supply structure of the above type for an internal combustion engine is disclosed in Japanese patent No. 2686595. The conventional lubricating oil supply structure has a free wheel doubling as the rotor of a generator and coupled to an end of a crankshaft. A free wheel gear has a bearing surface rotatably fitted over the crankshaft and positioned opposite to the stator of the generator axially across the free wheel. The free wheel gear is coupled to the free wheel by a one-way clutch. When the internal combustion engine starts to operate, the free wheel gear transmits rotational power from a starter motor to the free wheel and the crankshaft. To lubricate the bearing surface of the free wheel gear, a bearing near the free wheel of the input shaft of a transmission has an oil reservoir for being supplied with oil under pressure and a nozzle for ejecting oil in the oil reservoir toward the bearing surface. The bearing surface is lubricated with the oil ejected from the nozzle. With this structure, it is not necessary to define an oil hole for lubricating the bearing surface in the crankshaft, thus preventing the cost from increasing due to an increased number of steps for machining the crankshaft and also preventing the internal combustion engine from becoming larger in size due to an increased outside diameter of the crankshaft.

According to the above related art, the nozzle is defined in the bearing of the input shaft of the transmission. Accordingly, the bearing and the bearing surface of the free wheel gear are required to be positioned at such a distance over which the oil ejected from the nozzle reliably reaches the bearing surface. Furthermore, no member needs to be present in the ejected flow of oil between the input shaft and the crankshaft. The above requirements pose limitations on the layout of the free wheel gear and the bearing and also the layout of the generator and the transmission. Since the area of the bearing surface to which the ejected oil is applied depends on the layout of the transmission, the setting of the area to which the ejected oil flow is applied, including the setting of a plurality of areas on the bearing surface to which the ejected oil flow is applied, suffers from a small degree of freedom. In the generator, since the generating coil to be heated is positioned opposite to the free wheel gear axially across the free wheel, it is difficult to cool the generating coil with the oil supplied to the bearing surface.

SUMMARY OF THE INVENTION

The present invention has been made in view of the above drawbacks. It is an object of the present invention to provide a lubricating oil supply structure for an internal combustion engine, which requires no lubricating oil passage to be defined in a crankshaft. In addition, it is an object to provide a lubricating oil supply structure which is capable of ejecting lubricating oil to a lubrication object mounted on a crankshaft opposite to the stator of a generator across a flange of the rotor of the generator in an axial direction, is free of limitations on the layout of the generator and peripheral devices, is capable of cooling generating coils of the generator, and allows the area of the lubrication object to which the lubricating oil is applied to be set with large freedom. It is an object of a second aspect of the present invention to increase the ability to cool the generating coil. It is an object of a third aspect of the present invention to prevent the generator from being large in size. It is an object of a fourth aspect of the present invention to simplify a structure inside a housing member which stores the generator, to allow nozzles to be set in various positions with ease, and to obtain an ejected flow of lubricating oil with high directivity.

According to the first aspect of the present invention, a lubricating oil supply structure for an internal combustion engine includes a generator having a stator with a generating coil and a rotor coupled to a crankshaft. The generator is housed in a housing member, and a lubrication object is mounted on the crankshaft and is disposed opposite to the stator across a flange of the rotor in an axial direction of the crankshaft. Furthermore, the housing member has a nozzle forming region combined with a lubricating oil passage. The nozzle forming region has a first nozzle in communication with the lubricating oil passage for continuously ejecting lubricating oil. The first nozzle is disposed on the stator side in confronting relation to the flange in the axial direction. The rotor has a first through passage disposed at a position confronting the lubrication object in an ejected direction in which the lubricating oil is ejected from the first nozzle, so that the lubricating oil is ejected from the first nozzle through the first through passage to the lubrication object.

Since the first nozzle is provided in the nozzle forming region of the housing member which houses the generator having the rotor rotatable in unison with the crankshaft, the first nozzle and the lubrication object are provided about the crankshaft. Since the lubricating oil is ejected to the rotor from the first nozzle which is disposed on the stator side opposite to the flange and confronts the flange in the axial direction, the lubricating oil is ejected almost in its entirety to the generator reliably. The ejected lubricating oil is supplied to the lubrication object through the first through passage which is positioned intermittently in the ejected flow of lubricating oil depending on the angular position of the rotor. When the first through passage is not positioned in the ejected flow of lubricating oil, the lubricating oil hits the rotor and is scattered. Splashes of the scattered lubricating oil are applied mainly to the side of the generating coil near the flange.

As a result, the first aspect of the present invention offers the following advantages: The housing member has the nozzle forming region combined with the lubricating oil passage, and the nozzle forming region has the first nozzle in communication with the lubricating oil passage for continuously ejecting lubricating oil. Therefore, the first nozzle and the lubrication object are provided about the crankshaft. The lubricating oil is supplied to the lubrication object when it is ejected from the nozzle of the nozzle forming region of the housing member, without the need for forming a lubricating oil passage in the crankshaft. The nozzle does not pose limitations on the layout of the generator and devices disposed around the crankshaft.

The first nozzle is disposed on the stator side in confronting relation to the flange in the axial direction of the crankshaft, and the rotor has the first through passage disposed at a position confronting the lubrication object in the ejected direction in which the lubricating oil is ejected from the first nozzle. Accordingly, the lubricating oil is ejected from the first nozzle positioned near the stator to the rotor. Thus, the lubricating oil is ejected almost in its entirety to the generator reliably, and is ejected to the lubrication object through the first through passage in the rotor which rotates in unison with the crankshaft. Specifically, the lubricating oil continuously ejected from the first nozzle is supplied to the lubrication object through the first through passage which is positioned intermittently in the ejected flow of lubricating oil depending on the angular position of the rotor. When the first through passage is not positioned in the ejected flow of lubricating oil, the lubricating oil hits the rotor and is scattered. Splashes of the scattered lubricating oil are applied mainly to the side of the generating coil near the flange. Consequently, the lubrication object is lubricated by the lubricating oil which has passed through the first through passage, and the generating coil is simultaneously cooled by the scattered lubricating oil, thus increasing the generating efficiency of the generator.

Inasmuch as the first nozzle is provided in the nozzle forming region of the housing member, the position of the first nozzle can be set in the circumferential direction with a large degree of freedom, and the number of first nozzles can be set with a large degree of freedom. Therefore, the area of the lubrication object to which the lubricating oil is applied can be set with a large degree of freedom. The positions and number of first nozzles can be set appropriately from the standpoints of the ability to lubricate the lubrication object and the ability to cool the generator.

According to the second aspect of the present invention, in the lubricating oil supply structure for an internal combustion engine according to the first aspect of the present invention, the nozzle forming region has a second nozzle for continuously ejecting lubricating oil, so that the lubricating oil is ejected from the second nozzle to a side of the generating coil opposite to the flange.

The lubricating oil ejected from the nozzle and applied to and scattered by the rotor is applied mainly to a portion of the generating coil near the flange, and the lubricating oil ejected from the second nozzle is applied to a side of the generating coil which is opposite to the flange in the axial direction (hereinafter referred to as "opposite-to-flange side"). The lubricating oil applied to and scattered by this side is applied mainly to the generating coil and nearby generating coils on the opposite-to-flange side.

As a result, the second aspect of the present invention offers the following advantages: Since the second nozzle is provided for ejecting the lubricating oil to the opposite-to-flange side of the generating coil, the generating coil to which the lubricating oil ejected from the second nozzle is directly applied, and the nearby generating coils are cooled by the scattered lubricating oil. In addition, the lubricating oil ejected from the first nozzle is applied to the portion of the generating coil near the flange and cools the generating coil. Accordingly, the generating coil is cooled from axially opposite sides thereof, and hence the ability to cool the generating coil is increased. Inasmuch as the amounts of the lubricating oil ejected respectively from the first nozzle and the second nozzle can be set separately from each other, optimum ejected amounts of the lubricating oil can be set depending on the lubricating and cooling actions of the separately ejected flows of the lubricating oil.

According to the third aspect of the present invention, in the lubricating oil supply structure for an internal combustion engine according to the first and second aspects of the present invention, the stator has a second through passage confronting the first through passage in the ejected direction, so that the lubricating oil is ejected from the first nozzle through the second through passage and the first through passage to the lubrication object.

The flow of the lubricating oil ejected from the nozzle passes through the second through passage defined in the stator. Then, when the second through passage and the first through passage are in an overlapping position in the ejected direction depending on the angular position of the rotor, the ejected flow of the lubricating oil passes through the first through passage and is applied to the lubrication object. When the second through passage and the first through passage are not in an overlapping position in the ejected direction, the ejected flow of the lubricating oil is applied to and scattered by the rotor, and splashes of the lubricating oil are applied to the generating coil.

As a result, the third aspect of the present invention offers the following advantages: Since the stator has the second through passage in confronting relation to the first through passage in the ejected direction, the nozzle and the stator can be placed in an overlapping position in the axial direction. The generator is thus prevented from becoming large in size due to the nozzle.

According to the fourth aspect of the present invention, in the lubricating oil supply structure for an internal combustion engine according to the third aspect of the present invention, the nozzle forming region includes a stator support to which the stator is fixed. The first nozzle is open at an abutment surface held in abutment against the stator. Furthermore, the second through passage includes a through hole having an opening connected to the first nozzle on the abutment surface.

The nozzle forming region is provided by the stator support. Furthermore, the lubricating oil ejected from the first nozzle passes through the second through passage, which is substantially free of the effect of an air flow caused by the rotation of the rotor immediately after the lubricating oil is ejected. The oil then reaches the first through passage.

As a result, the fourth aspect of the present invention offers the following advantages: Since the nozzle forming region includes the stator support, the nozzle forming region is provided by the stator support. Therefore, the nozzle forming region does not need to be provided separately, and the structure in the housing member is simplified. The positions of the first and second nozzles and the number of the first and second nozzles can be set with ease from the standpoints of the ability to lubricate the lubrication object and the ability to cool the generating coil. The second through passage which comprises the through hole has the opening connected to the first nozzle on the abutment surface where the first nozzle is open. Consequently, the lubricating oil ejected from the first nozzle passes through the second through passage, which comprises the through hole which is substantially free of the effect of an air flow caused by the rotation of the rotor immediately after the lubricating oil is ejected. Since the distance over which the lubricating oil is exposed to the air flow is short after the lubricating oil is ejected from the first nozzle until it reaches the first through passage, the directivity of the ejected flow of the lubricating oil is increased. Even when the pressure of the lubricating oil is somewhat low, the ejected flow of the lubricating oil reliably passes through the first through passage and reaches the lubrication object, resulting in an increase in the ability to lubricate the lubrication object.

The terms "axial direction", "radial direction", and "circumferential direction" used in the specification mean the direction of the axis around which the crankshaft rotates, the radial direction extending radially from the axial direction, and the circumferential direction about the axial direction, respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
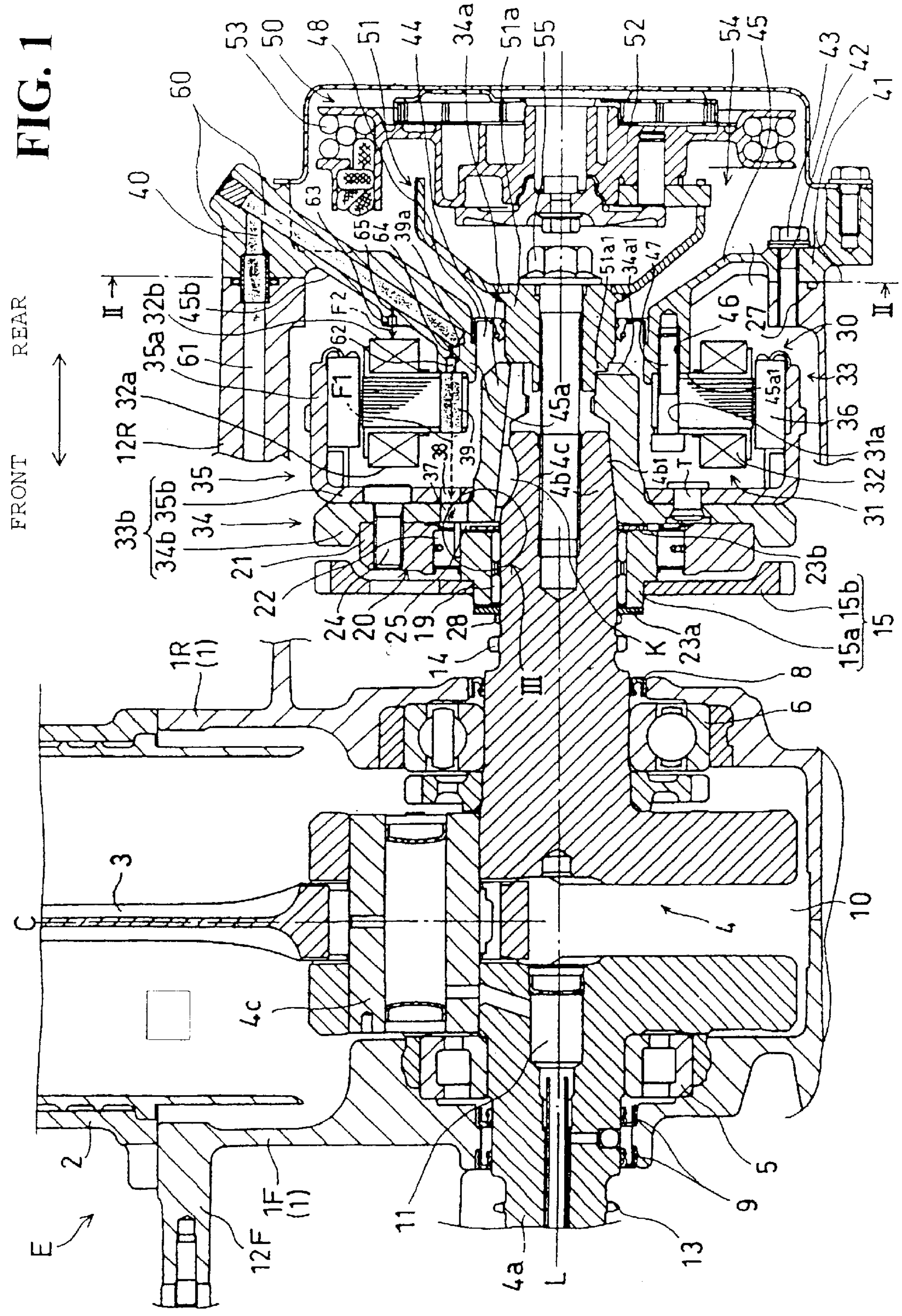
FIG. 1 is a cross-sectional view, taken along a plane including the rotational axis of a crankshaft of an internal combustion engine to which a lubricating oil supply structure according to the present invention is applied. A region of FIG. 1 which shows a starter driven gear, a one-way clutch, and a generator is a cross-sectional view taken along line I—I of FIG. 2.

An embodiment of the present invention will hereinafter be described below with reference to FIGS. 1 through 3. An internal combustion engine E to which a lubricating oil supply structure according to the present invention is applied includes a single-cylinder four-cycle internal combustion engine mounted on a four-wheel rough-terrain vehicle with a crankshaft 4 having a rotational axis L directed longitudinally of the vehicle, i.e., the engine being oriented longitudinally of the vehicle. As shown in FIG. 1, the internal combustion engine E has a crankcase 1 divided into two components, i.e., a front crankcase 1F and a rear crankcase 1R, a cylinder 2, a cylinder head (not shown), and a head cover (not shown) which are successively mounted on the crankcase 1 and fastened to the crankcase 1 by a plurality of through bolts.

A piston (not shown) is slidably fitted in the cylinder 2. A central axis C (see FIG. 2) of the cylinder 2 is slightly tilted to the left of the vehicle. The piston is connected to a crankpin 4*c* of the crankshaft 4 by a connecting rod 3. The piston is reciprocally moved under the combustion pressure in a combustion chamber which is defined between the cylinder head and the piston. The piston rotates the crankshaft 4 which is rotatably supported in the crankcase 1 by a pair of front and rear main bearings 5, 6.

The crankcase 1 is integrally formed with a transmission case 7 (see FIG. 2) which houses a power transmitting device and an output shaft, to be described below. The crankcase 1 has a closed crank chamber 10 defined by oil seals 8, 9 disposed axially outwardly of the front and rear main bearings 5, 6. Lubricating oil is supplied through a lubricating oil passage 11 defined in the crankshaft 4 to lubrication areas such as sliding surfaces between the crankpin 4*c* and the connecting rod 3, sliding surfaces between the cylinder 2 and the piston, and the front and rear main bearings 5, 6. After the lubricating oil has lubricated the above lubrication areas, the lubricating oil is drawn from the crank chamber 10 by a scavenging pump (not shown) and discharged from the crank chamber 10. Since the crankshaft 4 does not stir the lubricating oil in the crank chamber 10, the power loss of the internal combustion engine is reduced.

The crankshaft 4 has a front end portion 4*a* extending forwardly from the front main bearing 5 and covered with a front case cover 12F coupled to the front end of the front crankcase 1F. A drive sprocket 13 and a torque converter (not shown) which are successively arranged forwardly are mounted on the front end portion 4*a*. The drive sprocket 13 drives a chain engaging therewith to actuate coaxially positioned oil pumps, i.e., a feed pump for supplying lubricating oil to lubricate the lubrication areas of the internal combustion engine E and lubricating oil for use as working oil for various hydraulically operated devices, and the scavenging pump. The output power from the torque converter is transmitted to an output shaft extending longitudinally of the vehicle through a transmission clutch and a transmission (not shown), which make up the power transmitting device in combination with the torque converter. The output power from the torque converter is then transmitted from the output shaft to front and rear drive axles which are connected respectively to front and rear ends of the output shaft, thus rotating front and rear wheels of the vehicle.

The crankshaft 4 also has a rear end portion 4*b* extending rearwardly from the rear main bearing 6 and covered with a rear case cover 12R coupled to the rear end of the rear crankcase 1R. On the rear end portion 4*b*, a drive sprocket 14, a starter driven gear 15, and an alternator 30 are mounted in a successively rearward arrangement. The drive sprocket 14 drives a chain engaging therewith to rotate a camshaft for actuating an intake valve and an exhaust valve that are mounted in the cylinder head.

Figure 2:
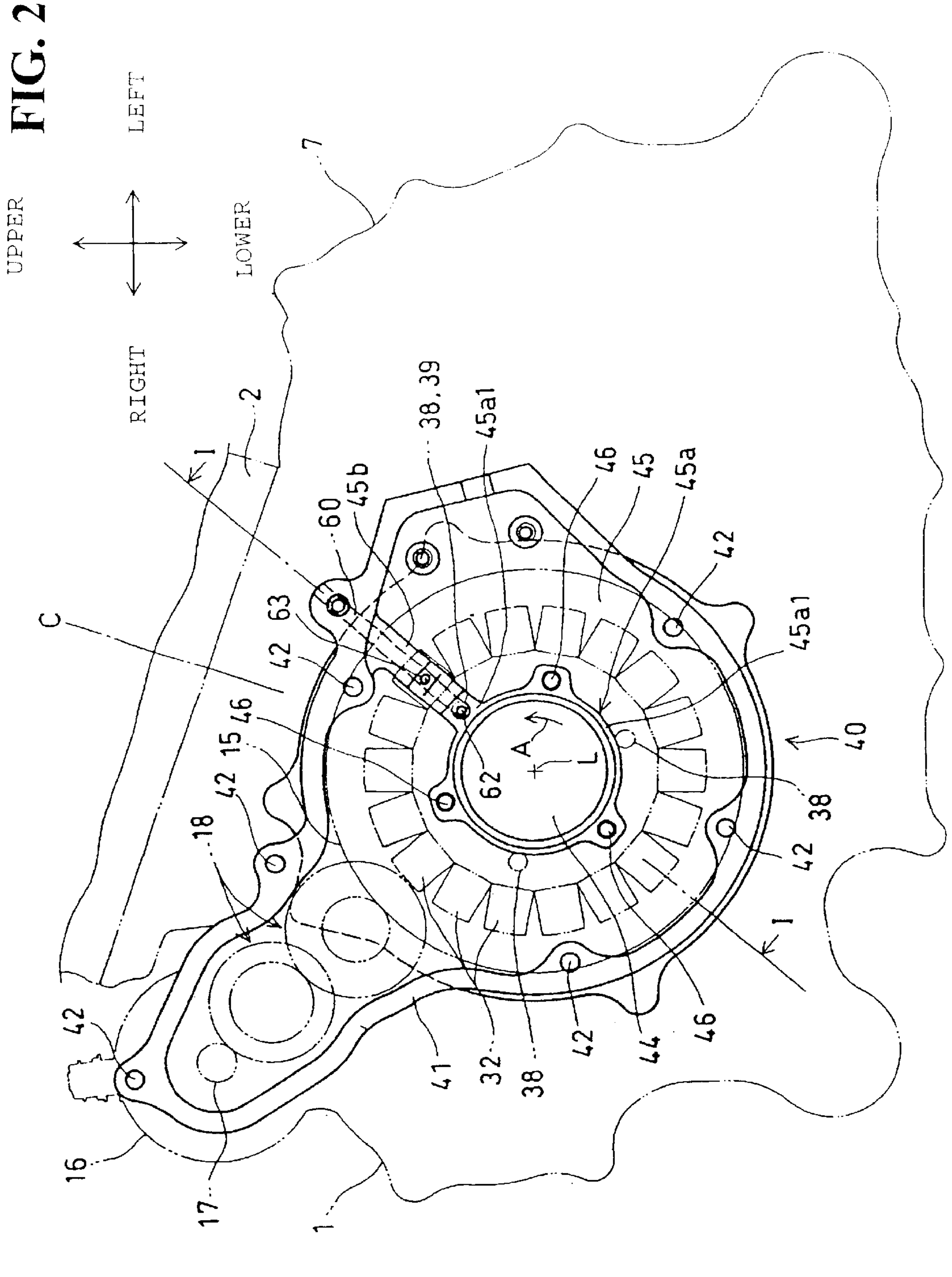
FIG. 2 is a front elevational view of a generator cover, taken along line II—II of FIG. 1.
Figure 3:
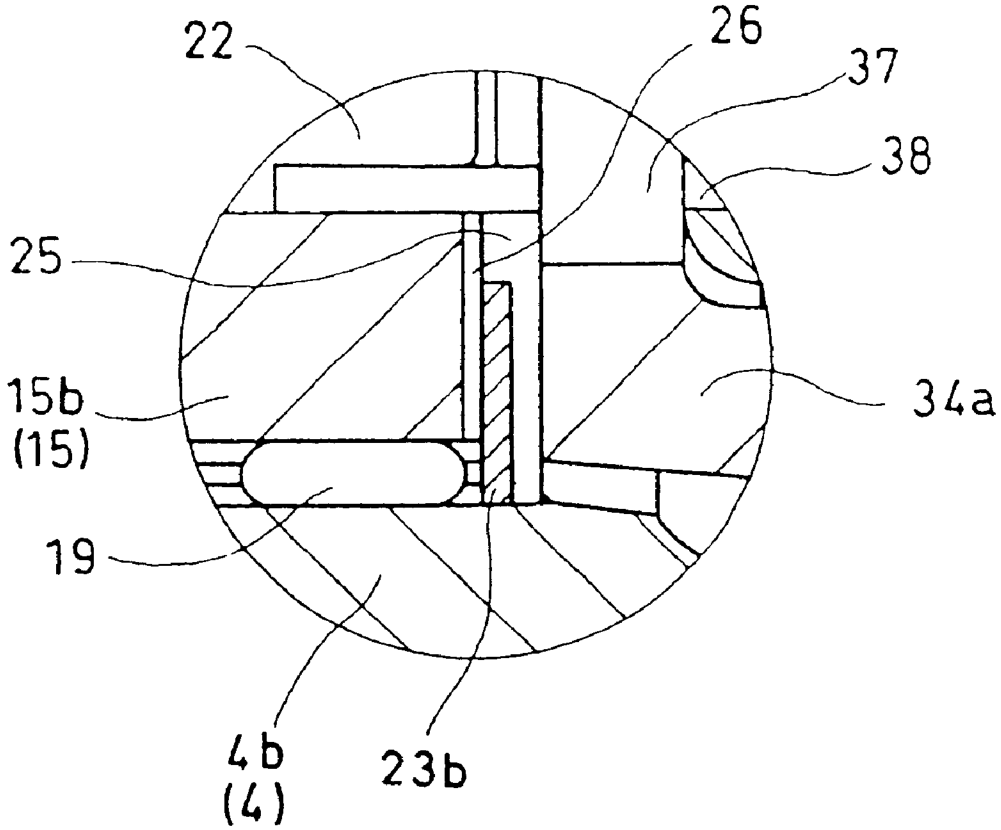
FIG. 3 is an enlarged view of an area III shown in FIG. 1.

As shown in FIGS. 1 and 2, a starter motor 16 has a pinion gear 17 which causes speed reduction gears 18 to rotate the starter driven gear 15. The starter driven gear 15 is rotatably supported on the crankshaft 4 by a bearing portion which is composed of a needle bearing 19 disposed between the inner circumferential surface of a cylindrical boss 15*a* thereof and the outer circumferential surface of the crankshaft 4. The starter driven gear 15 is also connected to the crankshaft 4 for rotation therewith by a known cam-type one-way clutch 20 and a generator 30. The needle bearing 19 is prevented from being axially displaced by a pair of front and rear annular side plates 23*a*, 23*b*.

The one-way clutch 20 includes an annular outer race 21 and a plurality of roller cams 22 disposed radially between the outer race 21 and the boss 15*a* and having respective cam surfaces. The outer race 21 is held against and integrally coupled to a flange 34*b* of a rotor 33 (which will be described later) of the generator 30 by a plurality of circumferentially spaced bolts 24. With the one-way clutch 20 and the generator 30 being integrally connected to each other, a gear 15*b* of the starter driven gear 15, the one-way clutch 20, and the flange 34*b* are disposed axially adjacent to each other, with an axially slight gap 25 being defined between the boss 15*a* and the cams 22, and the flange 34*b*. As shown in FIG. 3, a plurality of (four in the embodiment) radial grooves 26 are defined at substantially circumferentially equal intervals in the axially end surface of the boss 15*b* near the rotor 33. These grooves 26 provide a passageway for supplying lubricating oil to the needle bearing 19.

Referring back to FIGS. 1 and 2, the generator 30 comprises a stator 31 having generating coils 32 and fixed to a generator cover 40 and a cup-shaped rotor 33 integrally coupled to the crankshaft 4 in radially surrounding relation to the stator 31. The generator 30 is housed in a housing member which is made up of the rear case cover 12R and the generator cover 40 which surround the rear end portion 4*b* of the crankshaft 4. The generator cover 40 is coupled to a rear end of the rear case cover 12R by three bolts 43 which are inserted through insertion holes 42 defined in an outer circumferential edge 41 of the generator cover 40 and threaded into internally threaded holes 27 defined in the rear case cover 12R.

The generator cover 40 has a central hole 44 having an axis aligned with the rotational axis L and a funnel-shaped stator support 45 extending outwardly from the central hole 44 and supporting the stator 31 fixed thereto. The stator support 45 has an abutment surface 45*a*1 formed on an inner circumferential edge 45*a* thereof and held in abutment against the stator 31 and three internally threaded holes 46 defined in the inner circumferential edge 45*a*. The stator 31 is coupled to the stator support 45 by three bolts 47 inserted through insertion holes 31*a* in the stator 31 and threaded into the internally threaded holes 46.

The rotor 33 includes a joint member 34 integrally connecting the one-way clutch 20 and the crankshaft 4 to each other and a holder member 35 integrally coupled to the joint member 34 and holding permanent magnets 36 joined thereto. The joint member 34 includes a boss 34*a* having a tapered hole fitted over a tapered portion 4*b*1 on the rear end of the rear end portion 4*b* and coupled to the crankshaft 4 by a key K. A flange 34*b* larger in diameter than the outer race 21 of the one-way clutch 20 is joined to the outer race 21 by bolts 24. The holder member 35 includes a flange 35*b* fitted over the boss 34*a* and having an outside diameter substantially equal to the outside diameter of the flange 34*b*. The flange 35*b* is connected to the flange 34*b* by rivets T. A cylindrical portion 35*a* extends axially contiguously from the outer circumferential edge of the flange 35*b* and holds the permanent magnets 36 on an inner circumferential surface thereof in radially confronting relation to the stator 31.

The flanges 34*b*, 35*b* jointly make up a flange 33*b* of the rotor 33. The generating coils 32 are disposed in an annular space defined between the boss 34*a* and the cylindrical portion 35*a*. The generating coils 32 have a side 32*a* axially facing the flange 33*b* and a side 32*b* axially opposite to the side 32*a*, i.e., axially opposite to the flange 33*b*.

A recoil starter 50 having a pulley 51 is disposed behind the generator cover 40. The pulley 51 has a boss 51*a* extending through the central hole 44 and coupled to the boss 34*a* extending rearwardly of the crankshaft 4. Specifically, the boss 51*a* has a radial ridge 51*a*1 disposed on the front end face of the boss 51*a* and fitted in a radial groove 34*a*1 defined in the rear end face of the boss 34*a*, so that the pulley 51 is rotatable in unison with the rotor 33. With both end faces held in abutment against each other, a bolt 55 inserted into the boss 51*a* is threaded into an internally threaded hole 4*c* defined in the tapered portion 4*b*1 on the rear end of the rear end portion 4*b* and extending axially from the rear end of the crankshaft 4. An oil seal 48 is disposed between the outer circumferential surface of the boss 51*a* of the pulley 51 and the inner circumferential surface of the stator support 45 which radially confronts the outer circumferential surface of the boss 51*a*.

The starter driven gear 15, the one-way clutch 20, and the generator 30, which are mounted on the crankshaft 4, jointly make up a device whose front position is determined by the side plate 23*a* abutting against the front end face of the boss 15*a* and a protrusion 28 projecting from the outer circumferential surface of the crankshaft 4. The device is thus axially fixed to the crankshaft 4 with the rotor 33 fitted over the tapered portion 4*b*1. The starter driven gear 15 and the one-way clutch 20 are positioned opposite to the stator 31 axially across the flange 33*b* of the rotor 33.

For starting the internal combustion engine E with the starter motor 16, the rotation of the starter motor 16 is transmitted from the pinion gear 17 through the speed reduction gears 18 to the starter driven gear 15, and then through the one-way clutch 20 and the rotor 33 to the crankshaft 4, thus rotating the crankshaft 4. Thereafter, when the internal combustion engine E begins to rotate on its own, and the rotational speed of the crankshaft 4 exceeds the rotational speed of the starter driven gear 15, the transmission of the rotation from the crankshaft 4 to the starter driven gear 15 is cut off by the one-way clutch 20.

For starting the internal combustion engine E with the recoil starter 50, the user pulls a starter knob coupled to a recoil rope 53 wound around a reel 52. The rotation of the reel 52 is transmitted through the one-way clutch 54 to the pulley 51 and then through the rotor 33 to the crankshaft 4.

The stator support 45 which is positioned near the stator 31 axially opposite to the flange 33*b* of the rotor 33 has a ridge 45*b* extending radially obliquely upwardly to the left from the inner circumferential edge 45*a*. A lubricating oil passage 60 is defined in the generator cover 40 and also extends radially linearly in the ridge 45*b*. The lubricating oil passage 60 is in communication with an outlet port of the feed pump through a lubricating oil passage system which is made up of a lubricating oil passage 61 defined in the rear case cover 12R and respective lubricating oil passages (not shown) defined in the rear crank case 1R, the cylinder 2, the front crank case IF, and the front case cover 12F.

The ridge 45*b* has orifices 64, 65 defined therein for determining flow rates of the lubricating oil ejected therethrough and also first and second nozzles 62, 63 in communication with the lubricating oil passage 60 and disposed in axially confronting relation to the flange 33*b*. When the feed pump is actuated, the feed pump discharges the lubricating oil under pressure from the outlet port thereof. The discharged lubricating oil passes successively through an oil filter and the lubricating oil passages system, and is supplied to the lubricating oil passage 60. The discharged lubricating oil is then metered by the orifices 64, 65 and continuously ejected from the first and second nozzles 62, 63.

The first nozzle 62 is open at the abutment surface 45*a*1 abutting against the stator 31. As shown in FIG. 2, the first nozzle 62 is positioned to form an acute angle to an uppermost position taken up by through holes 37, 38 (described below) defined in the rotor 33, rearwardly in the rotational direction A in which the rotor 33 rotates. The second nozzle 63 which is positioned radially outwardly of the first nozzle 62 is open in a position axially confronting the side 32*b* of the generating coils 32 opposite to the flange 33*b*. The first and second nozzles 62, 63 are oriented to have respective ejected directions F1, F2 parallel to the axial direction. The stator support 45 thus serves as a nozzle forming region.

The flanges 34*b*, 35*b* making up the flange 33*b* of the rotor 33 have three through holes 37, 38 spaced at substantially circumferentially equal intervals at a position confronting the cams 22 of the one-way clutch 20 in the ejected direction F1 of the lubricating oil from the first nozzle 62 depending on the angular position of the rotor 33. Each of the through holes 37 are open at the gap 25. The through holes 37, 38 make up a first through passage. The one-way clutch 20 is lubricated by the lubricating oil ejected from the first nozzle 62, and serves as a lubrication object.

The stator 31 has one through hole 39 defined in a position confronting the first nozzle 62 in the ejected direction F1 and having an opening 39*a* connected to the first nozzle 62 on the abutment surface 45*a*1 of the stator support 45. The through hole 39 makes up a second through passage. The through holes 37, 38 take up a position confronting the through hole 39 in the ejected direction F1 depending on the angular position of the rotor 33.

The lubricating oil discharged from the feed pump while the internal combustion engine E is in operation is supplied through the lubricating oil passage system to the lubricating oil passage 60, metered by the orifices 64, 65, and then continuously ejected from the first and second nozzles 62, 63. The lubricating oil ejected from the first nozzle 62 passes through the through hole 39. Thereafter, when the through hole 39 takes up a position confronting the through holes 37, 38 in the ejected direction F1 depending on the angular position of the rotor 33, the ejected flow of the lubricating oil passes through the through holes 37, 38 and is applied to the cams 22 of the one-way clutch 20, thus lubricating the one-way clutch 20. A portion of the lubricating oil supplied to the one-way clutch 20 flows down the grooves 26 in the boss 15*a* and is supplied to the needle bearing 19, thus lubricating the needle bearing 19.

When the through hole 39 does not take up the position confronting the through holes 37, 38 in the ejected direction F1 depending on the angular position of the rotor 33, the lubricating oil ejected from the first nozzle 62 passes through the through hole 39 and is then applied to and scattered by the flange 35*b*. Since splashes of the lubricating oil are mainly applied to the portion of the generating coils 32 near the flange 33*b*, the generating coils 32 are cooled.

The lubricating oil ejected from the second nozzle 63 is applied to and scattered by the side 32*b* of the generating coil 32 opposite to the flange 33*b* which confronts the second nozzle 63 in the ejected direction F2. Therefore, since the ejected flow of the lubricating oil is applied to the generating coil 32 and splashes of the lubricating oil are applied to other nearby generating coils 32, these generating coils 32 are cooled.

Operation and advantages of the lubricating oil supply structure thus arranged will be described below.

With the starter driven gear 15, the one-way clutch 20, and the generator 30 mounted in respective positions on the crankshaft 4, the starter driven gear 15 and the one-way clutch 20 are positioned opposite to the stator 31 axially across the flange 33*b* of the rotor 33. Since the first and second nozzles 62, 63 for ejecting lubricating oil which has been supplied to the lubricating oil passage system and the lubricating oil passage 60 defined in the generator cover 40 are disposed on the stator support 45 of the generator cover 40 which has the rotor 33 rotatable in unison with the crankshaft 4, the first and second nozzles 62, 63 and the one-way clutch 20 are disposed about the crankshaft 4.

Since the first nozzle 62 for ejecting lubricating oil which has been supplied to the lubricating oil passage 60 defined in the stator support 45 of the generator cover 40 is disposed on the stator support 45, the first nozzle 62 and the one-way clutch 20 are disposed about the crankshaft 4. The lubricating oil is supplied to the one-way clutch 20 when it is ejected from the first nozzle 62 of the stator support 45, without the need for forming a lubricating oil passage in the crankshaft 4. Therefore, the first nozzle 62 poses almost no limitations on the layout of the generator 30 and devices disposed around the crankshaft 4. The first nozzle 62 serves as a highly effective lubricating oil supply means in the internal combustion engine E having the closed crank chamber 10 in which the one-way clutch 20 and the needle bearing 19 cannot expect being lubricated by splashes of the lubricating oil from the rear main bearing 6.

The first nozzle 62 is disposed near the stator 31 axially opposite to the flange 33*b* in the axial direction of the crankshaft 4, and the flange 33*b* of the rotor 33 has the through holes 37, 38 defined in a position confronting the one-way clutch 20 in the ejected direction F1 of the lubricating oil from the first nozzle 62. Since the lubricating oil is ejected to-the rotor 33 from the first nozzle 62 positioned near the stator 31, the lubricating oil is ejected almost in its entirety to the generator 30. The lubricating oil is ejected to the one-way clutch 20 through the through holes 37, 38 that are defined in the rotor 33 rotatable in unison with the crankshaft 4 at a position confronting the one-way clutch 20 in the ejected direction F1 of the lubricating oil. Specifically, the lubricating oil continuously ejected from the first nozzle 62 is supplied to the one-way clutch 20 through the through holes 37, 38 which are positioned intermittently in the ejected flow of lubricating oil depending on the angular position of the rotor 33. When the through holes 37, 38 are not positioned in the ejected flow of lubricating oil, the lubricating oil hits the rotor 33 and is scattered. Splashes of the scattered lubricating oil are applied mainly to the side of the generating coil 32 near the flange 33*b*. Therefore, at the same time that the one-way clutch 20 is lubricated by the lubricating oil that have passed through the through holes 37, 38, the generating coil 32 is cooled by the scattered lubricating oil, thus increasing the generating efficiency of the generator 30.

The stator support 45 has the second nozzle 63 for continuously ejecting the lubricating oil. When the lubricating oil is ejected from the second nozzle 63 to the side 32*b* of the generating coil 32 opposite to the flange 33*b*, the lubricating oil ejected from the first nozzle 62 and applied to and scattered by the flange 35*b* of the rotor 33 is applied mainly to the side of the generating coil 32 near the flange 33*b*. The lubricating oil ejected from the second nozzle 63 is applied to the side 32*b* of the generating coil 32. The lubricating oil scattered by the side 32*b* is applied mainly to the generating coil 32 and also portions of nearby generating coils 32 opposite to the flange 33*b*.

As a result, the generating coil 32 directly hit by the lubricating oil ejected from the second nozzle 63 and nearby generating coils 32 are cooled by the scattered lubricating oil. Also, because the lubricating oil ejected from the first nozzle 62 is applied to the portion of the generating coil 32 near the flange 33*b* and cools the generating coil 32, the generating coil 32 is cooled from axially opposite sides thereof, and hence the ability to cool the generating coil 32 is increased. Inasmuch as the amounts of the lubricating oil ejected respectively from the first nozzle 62 and the second nozzle 63 can be set separately from each other by the orifices 64, 65, optimum ejected amounts of the lubricating oil can be set depending on the lubricating and cooling actions of the separately ejected flows of the lubricating oil.

The stator 31 has the through holes 37, 38 defined in confronting relation to the through hole 39 in the ejected direction F1. When the lubricating oil is ejected from the first nozzle 62 through the through hole 39 and then the through holes 37, 38 to the one-way clutch 20, the ejected flow of the lubricating oil ejected from the first nozzle 62 passes through the through hole 39 of the stator 31. Thereafter, when the through hole 39 and the through holes 37, 38 overlap each other in the ejected direction F1 depending on the angular position of the rotor 33, the ejected flow of the lubricating oil passes through the through holes 37, 38 and is applied to the one-way clutch 20. When the through hole 39 and the through holes 37, 38 do not overlap each other in the ejected direction F1, the lubricating oil hits the rotor 33 and is scattered thereby, and splashes of the scattered lubricating oil are applied to the generating coil 32.

As a consequence, it is possible to locate the first nozzle 62 and the stator 31 in an axially overlapping position, thereby preventing the generator 30 from becoming large in size due to the first nozzle 62.

The first and second nozzles 62, 63 are disposed on the stator support 45. The first nozzle 62 is open at the abutment surface **45*a*1 abutting against the stator 31, and the through hole 39 has the opening 39*a* connected to the first nozzle 62 on the abutment surface 45*a*1. Therefore, the stator support 45 is used to provide the first and second nozzles 62, 63, and the lubricating oil ejected from the first nozzle 62 passes through the through hole 39, which is substantially free of the effect of an air flow caused by the rotation of the rotor 33 immediately after the lubricating oil is ejected, and reaches the through holes 37, 38**.

As a result, since the first and second nozzles 62, 63 are provided using the stator support 45, no separate nozzle forming region needs to be provided, the structure in the rear case cover 12R and the generator cover 40 is simplified, and the first and second nozzles 62, 63 are positionally set in the circumferential direction with a large degree of freedom. Consequently, the area of the one-way clutch 20 to which the lubricating oil is applied can be set with a large degree of freedom. The positions of the nozzles can be set appropriately with ease from the standpoints of the ability to lubricate the one-way clutch 20 and the ability to cool the generating coils 32.

Furthermore, the through hole 39 has the opening **39*a* connected to the first nozzle 62 on the abutment surface 45*a*1 where the first nozzle 62 is open. Accordingly, the lubricating oil ejected from the first nozzle 62 passes through the through hole 39, which is substantially free of the effect of an air flow caused by the rotation of the rotor 33 immediately after the lubricating oil is ejected. The distance over which the lubricating oil is exposed to the air flow is short after the lubricating oil is ejected from the first nozzle 62 until it reaches the through holes 37, 38. Accordingly, the directivity of the ejected flow of the lubricating oil is increased. Even when the pressure of the lubricating oil is somewhat low, the ejected flow of the lubricating oil reliably passes through the through holes 37, 38 and reaches the one-way clutch 20, resulting in an increase in the ability to lubricate the one-way clutch 20**.

The first nozzle 62 is positioned to form an acute angle to an uppermost position taken up by the through holes 37, 38 defined in the rotor 33, rearwardly in the rotational direction A in which the rotor 33 rotates. Some of the splashes produced when the lubricating oil ejected from the first nozzle 62 hits the flange **35*b* are carried on the air flow caused by the rotation of the rotor 33, and are applied to generating coils 32 in a wide range which are positioned forwardly of the first nozzle 62 in the rotational direction A. When the remainder of the splashes drop by gravity, they are applied to generating coils 32 which are positioned rearwardly of the first nozzle 62 in the rotational direction A. As a consequence, the generating coils 32** are cooled more uniformly.

Modifications of the above embodiment will be described below.

In the above embodiment, the first and second nozzles 62, 63 are provided, one for each, on the stator support 45. For lubricating the one-way clutch 20 more uniformly, or for cooling the generating coils 32 more uniformly, the first and second nozzles 62, 63 may be provided, in plurality for each. With such a modification, the nozzles are provided in different positions. The first and second nozzles 62, 63 may eject the lubricating oil in different ejected directions, or a plurality of first nozzles and a plurality of second nozzles may eject the lubricating oil in different ejected directions. In the above embodiment, the first and second nozzles 62, 63 are disposed on a linear portion of the lubricating oil passage 60 and hence are located in one circumferential position. However, the first and second nozzles 62, 63 may be located in different circumferential positions.

In the above embodiment, the lubrication object comprises the one-way clutch 20. However, the lubrication object may comprise any member or area which needs to be lubricated, e.g., a bearing on the crankshaft 4. In the above embodiment, the nozzle forming region comprises the stator support 45. However, the nozzle forming region may be in the form of a columnar member extending radially inwardly on the rear case cover 12R or the generator cover 40.

In the above embodiment, the second through passage comprises the through hole 39. However, the second through passage may be in the form of a groove or a recess. More or less than three through holes 37, 38 may be provided. In the above embodiment, the through hole 39 is provided. However, the through hole 39 may not be dispensed with, and the lubricating oil may be ejected from the first nozzle 62 through a radial gap between the rotor 33 and the stator 31 to the through holes 37, 38.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lubricating oil supply structure for an internal combustion engine comprising:

a generator including a stator with generating coils and a rotor coupled to a crankshaft of the internal combustion engine;

a housing member, said generator being housed in said housing member, said housing member having a nozzle forming region combined with a lubricating oil passage, said nozzle forming region having a first nozzle in communication with said lubricating oil passage for continuously ejecting lubricating oil; and a lubrication object mounted on said crankshaft and disposed opposite to said stator across a flange of said rotor in an axial direction of said crankshaft, wherein said first nozzle is disposed on a stator side of said housing member in confronting relation to said flange, said rotor having a first through passage disposed at a position confronting said lubrication object in a direction in which the lubricating oil is ejected from said first nozzle, so that the lubricating oil is ejected from said first nozzle through said first through passage to said lubrication object.

2. The lubricating oil supply structure for an internal combustion engine according to claim 1, wherein said nozzle forming region has a second nozzle for continuously ejecting lubricating oil, so that the lubricating oil is ejected from said second nozzle to a side of said generating coils opposite to said flange.

3. The lubricating oil supply structure for an internal combustion engine according to claim 1, wherein said stator has a second through passage confronting said first through passage in said ejected direction, so that the lubricating oil is ejected from said first nozzle through said second through passage and said first through passage to said lubrication object.

4. The lubricating oil supply structure for an internal combustion engine according to claim 2, wherein said stator has a second through passage confronting said first through passage in said ejected direction, so that the lubricating oil is ejected from said first nozzle through said second through passage and said first through passage to said lubrication object.

5. The lubricating oil supply structure for an internal combustion engine according to claim 3, wherein said nozzle forming region comprises a stator support to which said stator is fixed, said first nozzle being open at an abutment surface held in abutment against said stator, said second through passage comprising a through hole having an opening connected to said first nozzle on said abutment surface.

6. The lubricating oil supply structure for an internal combustion engine according to claim 4, wherein said nozzle forming region comprises a stator support to which said stator is fixed, said first nozzle being open at an abutment surface held in abutment against said stator, said second through passage comprising a through hole having an opening connected to said first nozzle on said abutment surface.

7. The lubricating oil supply structure for an internal combustion engine according to claim 1, wherein said lubricating object is a one-way clutch mounted to the crankshaft.

8. The lubricating oil supply structure for an internal combustion engine according to claim 1, wherein said housing member includes an orifice in communication with said lubricating oil passage, said orifice metering oil to said first nozzle.

9. The lubricating oil supply structure for an internal combustion engine according to claim 2, wherein said housing member includes first and second orifices in communication with said lubricating oil passage, said first orifice metering oil to said first nozzle and said second orifice metering oil to said second nozzle.

10. A lubricating oil supply structure for an internal combustion engine comprising:

a generator including a stator and a rotor coupled to a crankshaft of the internal combustion engine;

a lubrication object mounted on said crankshaft on a side of said rotor opposite to said rotor; and a housing member, said generator being housed in said housing member, said housing member having a lubricating oil passage and a nozzle in communication with said lubricating oil passage for continuously ejecting lubricating oil wherein said nozzle is disposed on a stator side of said housing member in confronting relation to said rotor, said rotor having a through passage oriented in confronting relation to said lubricating object and said nozzle, so that the lubricating oil is ejected from said nozzle through said through passage to said lubrication object.

11. The lubricating oil supply structure for an internal combustion engine according to claim 10, wherein said nozzle is a first nozzle, said housing further including a second nozzle for continuously ejecting lubricating oil, so that the lubricating oil is ejected from said second nozzle to a side of said stator opposite to said rotor.

12. The lubricating oil supply structure for an internal combustion engine according to claim 10, wherein said through passage in said rotor is a first through passage, said stator having a second through passage confronting said first through passage, so that the lubricating oil is ejected from said nozzle through said second through passage and said first through passage to said lubrication object.

13. The lubricating oil supply structure for an internal combustion engine according to claim 11, wherein said through passage in said rotor is a first through passage, said stator having a second through passage confronting said first through passage, so that the lubricating oil is ejected from said nozzle through said second through passage and said first through passage to said lubrication object.

14. The lubricating oil supply structure for an internal combustion engine according to claim 12, wherein said housing member includes a stator support to which said stator is fixed, said first nozzle being open at an abutment surface held in abutment against said stator, said second through passage comprising a through hole having an opening connected to said first nozzle on said abutment surface.

15. The lubricating oil supply structure for an internal combustion engine according to claim 13, wherein said housing member includes a stator support to which said stator is fixed, said first nozzle being open at an abutment surface held in abutment against said stator, said second through passage comprising a through hole having an opening connected to said first nozzle on said abutment surface.

16. The lubricating oil supply structure for an internal combustion engine according to claim 10, wherein said lubricating object is a one-way clutch mounted to the crankshaft.

17. The lubricating oil supply structure for an internal combustion engine according to claim 10, wherein said housing member includes an orifice in communication with said lubricating oil passage, said orifice metering oil to said nozzle.

18. The lubricating oil supply structure for an internal combustion engine according to claim 11, wherein said housing member includes first and second orifices in communication with said lubricating oil passage, said first orifice metering oil to said first nozzle and said second orifice metering oil to said second nozzle.

* * * * *